(12) United States Patent
Yanagida et al.

(10) Patent No.: US 7,678,724 B2
(45) Date of Patent: Mar. 16, 2010

(54) ELECTRONIC DEVICE, DIELECTRIC CERAMIC COMPOSITION AND THE PRODUCTION METHOD

(75) Inventors: Miyuki Yanagida, Narita (JP); Akira Sato, Inba-gun (JP)

(73) Assignee: TDK Corporation, Tokyo (JP)

( * ) Notice: Subject to any disclaimer, the term of this patent is extended or adjusted under 35 U.S.C. 154(b) by 208 days.

(21) Appl. No.: 11/808,533

(22) Filed: Jun. 11, 2007

(65) Prior Publication Data
US 2007/0284792 A1 Dec. 13, 2007

(30) Foreign Application Priority Data
Jun. 12, 2006 (JP) .............................. 2006-162796

(51) Int. Cl.
*C04B 35/468* (2006.01)
(52) U.S. Cl. ..................................... 501/139
(58) Field of Classification Search ................ 501/139
See application file for complete search history.

(56) References Cited

U.S. PATENT DOCUMENTS

| 6,346,497 | B1 | 2/2002 | Nakamura et al. | |
| 6,544,916 | B1* | 4/2003 | Sato et al. | 501/137 |
| 6,645,895 | B2 | 11/2003 | Sato et al. | |
| 6,800,270 | B2 | 10/2004 | Nomura et al. | |
| 6,809,052 | B2* | 10/2004 | Horie et al. | 501/138 |
| 7,399,724 | B2 | 7/2008 | Yanagida et al. | |
| 2004/0038800 | A1* | 2/2004 | Horie et al. | 501/139 |
| 2008/0004172 | A1* | 1/2008 | Kojima et al. | 501/139 |

FOREIGN PATENT DOCUMENTS

| EP | 1 138 652 A1 | 10/2001 |
| EP | 1 146 024 A1 | 10/2001 |
| EP | 1 186 578 A2 | 3/2002 |
| EP | 1 327 616 A2 | 7/2003 |
| EP | 1 669 334 A1 | 6/2006 |
| EP | 1 712 553 A2 | 10/2006 |
| EP | 1 820 784 A1 | 8/2007 |
| EP | 1 837 316 A2 | 9/2007 |
| EP | 1 840 104 A2 | 10/2007 |
| EP | 1 868 218 A2 | 12/2007 |
| JP | A 08-124785 | 5/1996 |
| JP | A-8-124785 | 5/1996 |
| JP | A 2000-281341 | 10/2000 |
| JP | A 2000-348961 | 12/2000 |
| JP | A-2002-80279 | 3/2002 |
| JP | A 2003-176180 | 6/2003 |
| JP | 2005029423 * | 2/2005 |
| JP | A 2005-29423 | 2/2005 |
| JP | A 2006-169004 | 6/2006 |
| JP | A 2006-169005 | 6/2006 |
| JP | A 2006-169006 | 6/2006 |
| JP | A-2007-145683 | 6/2007 |
| KR | 2000-23492 | 4/2000 |

OTHER PUBLICATIONS

U.S. Appl. No. 11/725,484, filed Mar. 20, 2007 in the name of Miyuki Yanagida et al.

* cited by examiner

*Primary Examiner*—Karl E Group
(74) *Attorney, Agent, or Firm*—Oliff & Berridge, PLC

(57) ABSTRACT

A production method of a dielectric ceramic composition comprising a main component including at least one selected from $BaTiO_3$, $BaCaTiO_3$, $BaTiZrO_3$ and $BaCaTiZrO_3$, and a fourth subcomponent including rare earth oxide; comprising steps of dividing a material of the main component to a first main component material and a second main component material, obtaining a post-reaction material by making the material of the first main component react in advance with a part of the fourth subcomponent material, and adding the material of the second main component and rest of the fourth subcomponent material into the post-reaction material; wherein, when number of moles of the first main component is n1 and number of moles of the second main component is n2, a ratio is $0.5 \leq n1/(n1+n2) \leq 1$: by which preferable characteristic can be obtained even when dielectric layers are made thin.

16 Claims, 1 Drawing Sheet

ELECTRONIC DEVICE, DIELECTRIC CERAMIC COMPOSITION AND THE PRODUCTION METHOD

BACKGROUND OF THE INVENTION

1. Field of the Invention

The present invention relates to a dielectric ceramic composition used as a dielectric layer of an electronic device, such as a multilayer ceramic capacitor, a production method thereof and an electronic device comprised of the dielectric ceramic composition as a dielectric layer.

2. Description of the Related Art

A multilayer ceramic capacitor as an example of electronic devices is produced, for example, by printing internal electrodes in a predetermined pattern on a ceramic green sheet formed by a predetermined dielectric ceramic composition, alternately stacking the results to form as one body, and co-firing a thus obtained green chip. Since internal electrode layers of the multilayer ceramic capacitor are formed to be one body with ceramic dielectric by firing, materials not reacting with the ceramic dielectric has to be selected. Therefore, in the related art, it has been necessary to use expensive precious metals, such as platinum and palladium, as the material composing the internal electrode layer.

In recent years, however, dielectric ceramic compositions using inexpensive base metals, such as nickel and copper, have been developed and a drastic reduction of costs has been realized.

Also, in recent years, demands for downsizing of electronic devices have become stronger along with electronic circuits becoming higher in density, and multilayer ceramic capacitors have rapidly become downsized with a larger capacity. To attain a downsized multilayer ceramic capacitor with a larger capacity, a method of making dielectric layers thinner and a method of heightening specific permittivity of a dielectric ceramic composition included in dielectric layers, etc. have been generally used. However, when dielectric layers are made thin, an electric field imposed on the dielectric layers becomes stronger at the time of applying a direct current voltage, consequently, there has been a disadvantage that a change of the specific permittivity with time, that is, a change of the capacity with time becomes remarkably large.

To improve a change of the capacity with time under a direct current electric field, there has been proposed a method of using dielectric particles having a small average crystal grain diameter as dielectric particles to be included in the dielectric layers (for example, refer to the Japanese Unexamined Patent Publication No. H08-124785). The Japanese Unexamined Patent Publication No. H08-124785 discloses a dielectric ceramic composition having a specific composition, wherein an average crystal grain diameter of the dielectric particles is 0.45 µm or smaller. However, the dielectric ceramic composition described in the article has too low specific permittivity to respond to downsizing and obtaining of a larger capacity.

Also, the present inventors have disclosed in the Japanese Unexamined Patent Publication No. 2005-29423 an electronic device, such as a multilayer ceramic capacitor, having improved specific permittivity and an accelerated lifetime of insulation resistance (IR) by dividing rare earth elements to two groups based on a value of effective ionic radius for coordination number 9, setting an adding quantity of elements belonging to one group and an adding quantity of elements belonging to the other group to be in a specific range, and setting a ratio of the adding quantities to be in a specific range.

However, along with rapid downsizing of electronic devices, multilayer ceramic capacitors are also required to be furthermore downsized and to have a larger capacity. As explained above, as a method of downsizing a multilayer ceramic capacitor and increasing the capacity, a method of making the dielectric layers thinner and a method of improving the specific permittivity are used. When making the dielectric layers thinner, a change of specific permittivity with time and other characteristics (a temperature characteristic of capacitance and IR accelerated lifetime, etc.) are required to be equivalent to those before making the layers thinner or even improved. Accordingly, to attain downsizing of a multilayer ceramic capacitor and to increase the capacity, the dielectric layers are required to be thinner while maintaining various characteristics (a change of specific permittivity with time, a temperature characteristic of capacitance and an IR accelerated lifetime, etc.) and to improve the specific permittivity.

Also, due to the variety of applications for multiplayer ceramic capacitors, a wide range of characteristics is required as well. Accordingly, a dielectric ceramic composition composing the dielectric layers has been demanded to have a composition designed to respond to the required specific characteristics while also maintaining high quality in other characteristics. However, in the dielectric ceramic composition disclosed in the Japanese Unexamined Patent Publication No. 2005-29423, preferable characteristics are limited in some cases and there has been a tendency of being in short of flexibility when trying to obtain characteristics according to the usage.

SUMMARY OF THE INVENTION

An object of the present invention is to provide a dielectric ceramic composition, capable of making dielectric layers thin, of exhibiting high specific permittivity and a preferable temperature characteristic of capacitance, and of improving reliability even when the main component of the dielectric ceramic composition varies, and the production method thereof. Another object of the invention is to provide an electronic device, such as a multilayer ceramic capacitor, having a dielectric layer composed of a dielectric ceramic composition as such.

The present inventors used a method of dividing a main component material to a material of a first main component and a material of a second main component when using a variety of compounds having a perovskite-type crystal structure as the main component, bringing only the first main component material react with a material of an oxide of rare earth elements to be added as a subcomponent to obtain a post-reaction material and adding the second main component material and materials of remaining subcomponents to the post-reaction material. Also, in the above adding method, a ratio of the first main component to the entire main component was set to be in a specific range. As a result, they found that specific characteristics (a dielectric loss and CR product, etc.) could become preferable while maintaining the specific permittivity and a temperature characteristic of the capacitance.

Also, the present inventors have found that the above effects could be furthermore enhanced by dividing the above rare earth elements to two groups based on a value of effective ionic radius for coordination number 9, using the above method when adding oxides of elements selected from one or both of the two groups, and setting a ratio of number of moles of elements belonging to one group and number of moles of elements belonging to the other group in the two groups to be in a specific range in the finally obtained dielectric ceramic composition, and completed the present invention.

Namely, according to a first aspect of the present invention, there is provided a production method of a dielectric ceramic composition comprising a main component including a compound having a perovskite-type crystal structure expressed by a general formula $ABO_3$ (note that "A" is Ba alone or a composite of Ba and Ca, and "B" is Ti alone or a composite of Ti and Zr), and a fourth subcomponent including an oxide of R (note that R is at least one selected from Y, La, Ce, Pr, Nd, Pm, Sm, Eu, Gd, Tb, Dy, Ho, Er, Tm, Yb and Lu); comprising steps of:

dividing a material of the first main component to two as a material of a first main component and a material of a second main component, obtaining a post-reaction material by bringing the material of the first main component to react in advance with a part of a material of the fourth subcomponent to be included in the dielectric ceramic composition, and adding the material of the second main component and rest of the material of the fourth subcomponent to be included in the dielectric ceramic composition into the post-reaction material, wherein, when assuming that number of moles of the first main component is n1 mole and number of moles of the second main component is n2, a ratio of the first main component to total number of moles of the first main component and the second main component is $0.5 \leq n1/(n1+n2) \leq 1$, preferably, $0.5 < n1/(n1+n2) < 1$, and more preferably $0.75 \leq n1/(n1+n2) \leq 0.9$.

In the first aspect, it is significant that a material of the main component is divided to a material of a first main component and a material of a second main component, and only the material of the first main component is reacted in advance with a part of a material of the fourth subcomponent. Furthermore, a ratio of the first main component to the entire main component is set to be in the above range. When bringing the material of the main component to react with a part of the material of the fourth subcomponent, many of the characteristics can be improved, while some characteristics are deteriorated a little due to the reaction. Therefore, not all of the main component material is reacted with the fourth subcomponent material, but a part (the first main component) of the main component material is reacted with the fourth subcomponent material so as to obtain a post-reaction material. By adding a material of the second main component keeping characteristics of the main component to the post-reaction material, required characteristics can be realized and, moreover, specific characteristics can be also made preferable.

Note that by bringing the first main component to react with a part of the fourth subcomponent, at least, it is possible to obtain a post-reaction material wherein the fourth subcomponent is included inside particles of the first main component.

In the first aspect, it is sufficient if at least the fourth subcomponent exists inside of particles of the main component in the obtained post-reaction material. Namely, for example, the fourth subcomponent may be unevenly or uniformly distributed inside of particles of the main component, and alternately, the content ratio may gradually change therein.

Then, the second main component and rest of the fourth subcomponent to be included in a dielectric ceramic composition are added to the obtained post-reaction material. As a result, while maintaining the specific permittivity and a temperature characteristic of the capacitance, etc. preferable, other characteristics, such as a dielectric loss and CR product, can become preferable.

Furthermore, as a material of the main component, a variety of compounds having a perovskite-type crystal structure as explained above can be used. As a result, it is possible to produce a dielectric ceramic composition capable of flexibly responding to required characteristics.

In the first aspect, preferably, the material of the first main component and at least a part of the material of the fourth subcomponent are dispersed as solid solution in advance, the resulting post-reaction material is used. As a result, the fourth subcomponent can be dispersed uniformly in the main component as solid solution, and consequently, the above characteristics can be furthermore improved.

In the first aspect, the word "reaction" is used based on a concept of including solid dispersion and coating, etc. and includes a method for creating a state where the fourth subcomponent exists inside the first main component.

In the first aspect, a content of the fourth subcomponent in the finally obtained dielectric ceramic composition is preferably 0.1 to 10 moles and, more preferably, 0.2 to 6 moles with respect to 100 moles of the main component when calculated as a conversion of R.

By setting a content of the fourth subcomponent included in the dielectric ceramic composition to be within the above range, a temperature characteristic of the capacitance can be improved. When the content of the fourth subcomponent is too small, the effect of adding the fourth subcomponent cannot be obtained and a temperature characteristic of the capacitance tends to decline, while when the content is too large, the sinterability tends to decline.

In the first aspect, preferably, a content of the fourth subcomponent to be reacted in advance with a material of the first main component is more than 0 to 0.5 mole in terms of R with respect to 100 moles of the main component.

Alternatively, in the present invention, a ratio of the fourth subcomponent to be reacted in advance with a material of the first main component is preferably more than 0 to 50 mol % and, more preferably, more than 0 to 25 mol % in terms of R with respect to 100 mol % as a total amount of the fourth subcomponent to be finally included in the dielectric ceramic composition.

When an amount of the fourth subcomponent to be reacted in advance with a material of the first main component is too large, a crystal grain diameter of a sintered body to be obtained after firing becomes too large and it is liable that the temperature characteristic declines and the insulation resistance (IR) declines.

According to a second aspect of the present invention, there is provided a production method of a dielectric ceramic composition comprising a main component including a compound having a perovskite-type crystal structure expressed by a general formula $ABO_3$ (note that "A" is Ba alone or a composite of Ba and Ca, and "B" is Ti alone or a composite of Ti and Zr), a fourth (a) subcomponent including an oxide of R1 (note that R1 is at least one selected from rare-earth elements having an effective ionic radius for coordination number 9 of less than 108 pm), and a fourth (b) subcomponent including an oxide of R2 (note that R2 is at least one selected from rare-earth elements having an effective ionic radius for coordination number 9 of 108 pm to 113 pm);

comprising steps of:

dividing a material of the main component to two as a material of a first main component and a material of a second main component, obtaining a post-reaction material by bringing the material of the first main component to react in advance with a part of a material of the fourth (a) subcomponent and/or a part of the material of the fourth (b) subcomponent to be included in the dielectric ceramic composition; and adding the material of the second main component and rest of materials of the fourth (a) subcomponent and the fourth (b) subcomponent to be included in the dielectric ceramic composition into the post-reaction material;

wherein a ratio (M2/M1) of number of moles M2 of R2 of the fourth (b) subcomponent to number of moles M1 of R1 of the fourth (a) subcomponent in the dielectric ceramic composition to be obtained finally satisfies $0 \leq M2/M1 \leq 0.25$, and when assuming that number of moles of the first main component is n1 mole and number of moles of the second main component is n2, a ratio of the first main component to total number of moles of the first main component and the second main component is $0.5 \leq n1/(n1+n2) \leq 1$, preferably $0.5 < n1/(n1+n2) < 1$, more preferably $0.75 \leq n1/(n1+n2) \leq 0.90$.

In the second aspect, R in the first aspect is divided to R1 and R2 based on a value of effective ionic radius for coordination number 9 of R elements, a subcomponent including an oxide of R1 is referred to as a fourth (a) subcomponent and a subcomponent including an oxide of R2 is referred to as a fourth (b) subcomponent. In the same way as in the first aspect, it is significant that a material of the main component is divided to a material of a first main component and a material of a second main component, and only the material of the first main component is reacted in advance with a part of a material of the fourth (a) subcomponent and/or a part of a material of the fourth (b) subcomponent. Furthermore, by setting a ratio of the first main component to the entire main component to be within the above range, while maintaining high specific permittivity, preferable temperature characteristics and IR lifetime, etc., other characteristics, such as a dielectric loss and CR product, can become preferable.

In the same way as in the first aspect, when bringing a material of the first main component to react with a part of a material of the fourth (a) subcomponent and/or a part of a material of the fourth (b) subcomponent, many of the characteristics can be improved, while some characteristics are deteriorated a little due to the reaction. Therefore, by using both of the first main component reacted in advance with the fourth (a) subcomponent and/or the fourth (b) subcomponent and the second main component not to be reacted in advance, deterioration of the characteristics can be suppressed minimum.

Note that by bringing a material of the first main component to react in advance with a part of a material .of the fourth (a) subcomponent and/or a part of a material of the fourth (b) subcomponent, at least, a post-reaction material wherein the fourth (a) subcomponent and/or the fourth (b) subcomponent exist inside particles of the first main component can be obtained.

In the second aspect, it is sufficient if at least the fourth (a) subcomponent and/or the fourth (b) subcomponent exist inside of particles of the first main component in the obtained post-reaction material. Namely, in the same way as in the first aspect, for example, the fourth (a) subcomponent and/or the fourth (b) subcomponent may be unevenly or uniformly distributed inside of the particles of the first main component, and alternately, the content ratio may gradually change therein.

Then, a material of the second main component and rest of the fourth (a) subcomponent and/or the fourth (b) subcomponent to be included in a finally obtained dielectric ceramic composition are added to the obtained post-reaction material, and a ratio (M2/M1) of number of moles M2 of R2 of the fourth (b) subcomponent to number of moles M1 of R1 of the fourth (a) subcomponent in the finally obtained dielectric ceramic composition is set to be in the above range.

As a result, while improving the specific permittivity and maintaining a temperature characteristics of the capacitance preferable, other characteristics can become preferable, such that the dielectric loss is declined and the CR product becomes preferable.

Furthermore, as a material of the main component, a variety of compounds having a perovskite-type crystal structure explained above can be used. As a result, it is possible to produce a dielectric ceramic composition capable of flexibly responding to the required characteristics.

In the second aspect, preferably, the material of the first main component and a part of the material of the fourth (a) subcomponent and/or a part of the material of the fourth (b) subcomponent are dispersed as solid solution in advance. As a result, the fourth (a) subcomponent and/or the fourth (b) subcomponent can be uniformly dispersed in the first main component as solid solution and the characteristics explained above can be furthermore improved.

In the second aspect, the word "reaction" is used based on a concept of including solid dispersion and coating, etc. and includes a method for creating a state where the fourth subcomponent (a) and/or the fourth (b) subcomponent exist inside the first main component.

In the second aspect, a content of the fourth (a) subcomponent in the finally obtained dielectric ceramic composition is preferably more than 0 to 10 moles with respect to 100 moles of the main component in terms of R1. The lower limit of the content of the fourth (a) subcomponent is more preferably 0.1 mole or larger and, furthermore preferably, 0.2 mole or larger in terms of R1. Also, the upper limit of the content of the fourth (a) subcomponent is more preferably 6 moles or smaller and, furthermore preferably, 5 moles or smaller in terms of R1.

Also, a content of the fourth (b) subcomponent in the finally obtained dielectric ceramic composition is preferably more than 0 to 2 moles and, more preferably, more than 0 to 1 mole with respect to 100 moles of the main component in terms of R2.

In the second aspect, by setting contents of the fourth (a) subcomponent and the fourth (b) subcomponent included in the finally obtained dielectric ceramic composition to be in the above range, both of the specific permittivity and a temperature characteristic of the capacitance can become preferable and, moreover, the IR accelerated lifetime can become preferable. When a content of the fourth (a) subcomponent is too small, the effect of improving a temperature characteristic of the capacitance cannot be obtained, while when the content of the fourth (a) subcomponent is too large, the sinterability tends to decline. When a content of the fourth (b) subcomponent is too small, the effect of improving the IR and the IR accelerated lifetime cannot be obtained, while when the content of the fourth (b) subcomponent is too large, a temperature characteristic of the capacitance tends to be deteriorated.

In the second aspect, the fourth (a) subcomponent and/or the fourth (b) subcomponent to be reacted in advance with the first main component are preferably more than 0 to 0.5 mole and, more preferably, more than 0 to 0.4 mole with respect to 100 moles of the main component in terms of R1 and/or R2.

When an amount of materials of the fourth (a) subcomponent and/or the fourth (b) subcomponent to be reacted in advance with a material of the first main component is too large, a crystal grain diameter of a sintered body to be obtained after firing becomes too large, and it is liable that a temperature characteristic of the capacitance and the IR accelerated lifetime tends to decline.

In the second aspect, preferably, when assuming that an effective ionic radius for coordination number 9 of rare earth elements composing the R1 is r1 and an effective ionic radius for coordination number 9 of rare earth elements composing the R2 is r2, the R1 and the R2 are selected so that a ratio (r2/r1) of r1 and r2 satisfies a relationship of 1.007<r2/r1<1.06.

In the second aspect, preferably, the R1 is at least one selected from Y, Ho, Er, Tm, Yb and Lu.

In the second aspect, preferably, the R2 is at least one selected from Dy, Tb, Gd and Eu.

By selecting R1 and R2 by setting the ratio of effective ionic radius for coordination number 9 of R1 and R2 to be in the above range, the effects of the present invention can be furthermore enhanced.

Note that a value of effective ionic radius mentioned in the present specification is a value based on the article "R. D. Shannon, Acta Crystallogr., A32,751 (1976)".

In both of the first and second aspects, preferably, the main component includes barium titanate.

In both of the first and second aspects, preferably, the dielectric ceramic composition furthermore comprises
 a first subcomponent including at least one selected from MgO, CaO, BaO and SrO,
 a second subcomponent including mainly $SiO_2$ and at least one selected from MO (note that M is at least one selected from Mg, Ca, Ba and Sr), $Li_2O$ and $B_2O_3$, and
 a third subcomponent including at least one selected from $V_2O_5$, $MoO_3$ and $WO_3$; and
 ratios of the respective subcomponents with respect to 100 moles of the main component are
 the first subcomponent: 0.1 to 5 moles,
 the second subcomponent: 0.1 to 12 moles, and
 the third subcomponent: more than 0 to 0.3 mole.

In both of the first and second aspects, preferably, the dielectric ceramic composition furthermore comprises a fifth subcomponent including MnO and/or $Cr_2O_3$, and a ratio of the fifth subcomponent with respect to 100 moles of the main component is 0.05 to 1.0 mole.

In the first aspect, as a result that the first to third subcomponent (more preferably, furthermore the fifth subcomponent) are included together with the fourth subcomponent, a temperature characteristics of the capacitance can be improved and, particularly, the X7R characteristics (−55 to 125° C., ΔC=within ±15%) of the EIA standard can be satisfied.

In the second aspect, as a result that the first to third subcomponent (more preferably, furthermore the fifth subcomponent) are included together with the fourth (a) subcomponent and the fourth (b) subcomponent, a temperature characteristics of the capacitance can be improved and, particularly, the X7R characteristics (−55 to 125° C., ΔC=within ±15%) of the EIA standard can be satisfied. Note that timing of adding the first to third and fifth subcomponents is not particularly limited, but it is preferable that the first to third and fifth subcomponents are added to the post-reaction material after the reaction.

In both of the first and second aspects, a material having an average particle diameter of preferably 0.05 to 0.5 μm and, more preferably 0.1 to 0.4 μm is used as a material of the main component. By using a material of the main component having an average particle diameter in the above range, an average crystal grain diameter of dielectric particles after sintering can preferably become as fine as 0.1 to 0.3 μm, so that a change of specific permittivity with time can be reduced.

A dielectric ceramic composition of the present invention is produced by any one of the methods explained above.

An electronic device according to the present invention comprises a dielectric layer composed of the dielectric ceramic composition explained above. The electronic device is not particularly limited and multilayer ceramic capacitors, piezoelectric elements, chip inductors, chip varisters, chip thermisters, chip resistors and other surface mounted (SMD) chip type electronic devices may be mentioned.

According to the present invention, a material of the main component is divided to a first main component material and a second main component material, a ratio of the first main component to total number of moles of the first main component and the second main component is set to be in the above range, and only a material of the first main component is reacted with a material of an oxide (a fourth subcomponent) of a rare-earth element as a subcomponent to obtain a post-reaction material. By adding the second main component and rest of the subcomponent to the post-reaction material, both of the post-reaction material and a material of the second main component are used, consequently, it is possible to provide a dielectric ceramic composition, wherein characteristics, such as a specific permittivity and IR lifetime, can be maintained preferable, while other specific characteristics (a dielectric loss and CR product, etc.) are preferable, and a production method thereof.

Furthermore, the rare-earth elements are divided to R1 and R2 based on an effective ionic radius for coordination number 9 of the rare-earth elements, a subcomponent including an oxide of R1 is referred to as a fourth (a) subcomponent, and a subcomponent including an oxide of R2 is referred to as a fourth (b) subcomponent. Then, the method explained above is used for adding oxides of elements selected from one or both of the fourth (a) subcomponent and the fourth (b) subcomponent, and a ratio (M2/M1) of a number of moles M2 of R2 of the fourth (b) subcomponent to a number of moles M1 of R1 of the fourth (a) subcomponent is set to be in the above range in the finally obtained dielectric ceramic composition, so that the effects explained above can be furthermore enhanced.

BRIEF DESCRIPTION OF DRAWINGS

These and other objects and features of the present invention will become clearer from the following description of the preferred embodiments given with reference to the attached drawing, in which.

DESCRIPTION OF THE PREFERRED EMBODIMENT

Multilayer Ceramic Capacitor 1

Figure 1:
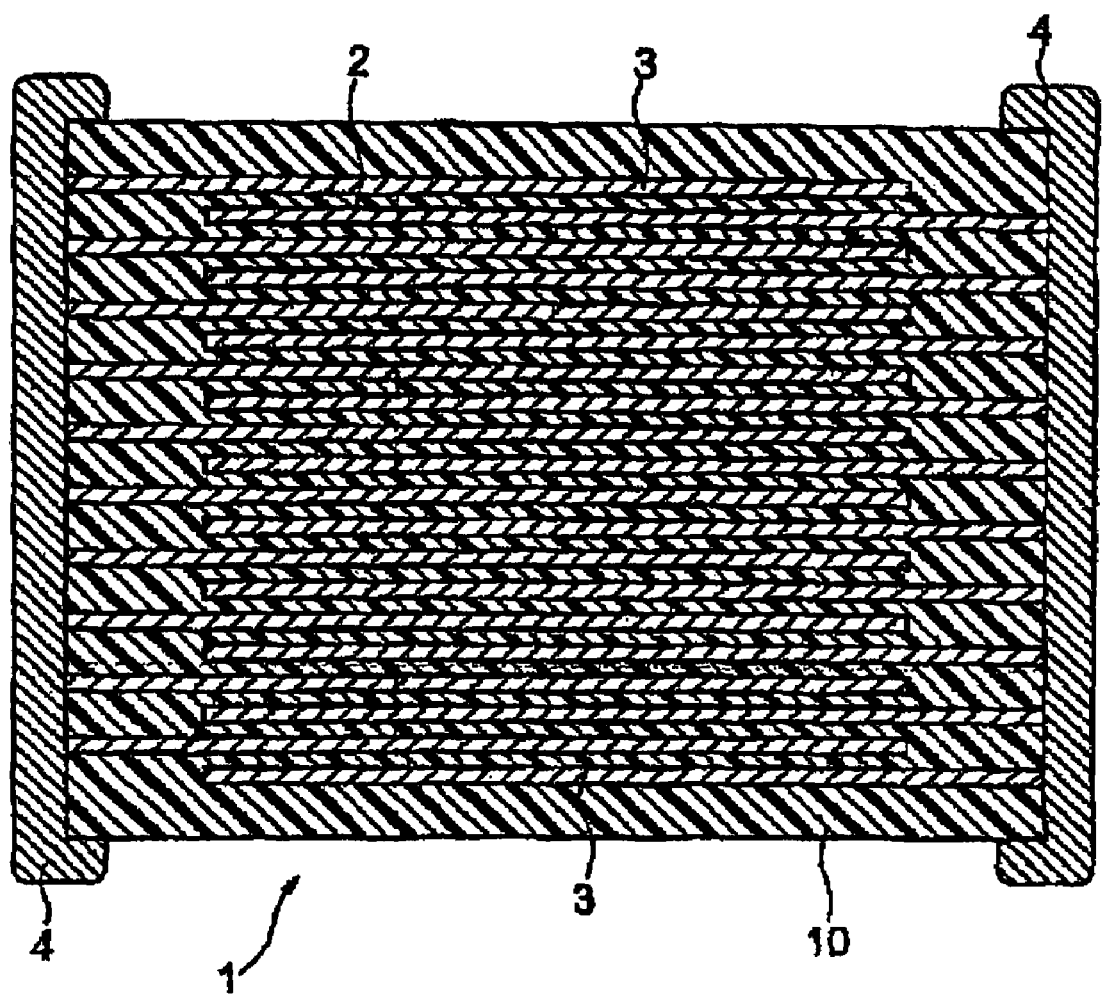
FIG. 1 is a sectional view of a multilayer ceramic capacitor according to an embodiment of the present invention.

As shown in FIG. 1, a multilayer ceramic capacitor 1 according to an embodiment of the present invention has a capacitor element body 10 configured by alternately stacking dielectric layers 2 and internal electrode layers 3. On both end portions of the capacitor element body 10, a pair of external electrodes 4 respectively conducting to the internal electrode layers 3 alternately arranged inside the element body 10 are formed. A shape of the capacitor element body 10 is not particularly limited but is normally a rectangular parallelepiped shape. Also, a size thereof is not particularly limited and may be suitably determined in accordance with the use object.

The internal electrode layers 3 are stacked, so that respective end surfaces thereof are exposed to surfaces of two facing end portions of the capacitor element body 10. The pair of external electrodes 4 are formed on both end portions of the capacitor element body 10 and connected to the exposed end surfaces of the alternately arranged internal electrode layers 3 so as to configure a capacitor circuit.

Dielectric Layer 2

The dielectric layers 2 include the dielectric ceramic composition according to the first and second aspects of the present invention.

The dielectric ceramic composition according to the first aspect includes at least a main component including a compound having a perovskite-type crystal structure expressed by a general formula $ABO_3$ (Note that "A" is Ba alone or a composite of Ba and Ca, and "B" is Ti alone or a composite of Ti and Zr) and a fourth subcomponent including an oxide of R (note that R is at least one selected from Y, La, Ce, Pr, Nd, Pm, Sm, Eu, Gd, Tb, Dy, Ho, Er, Tm, Yb and Lu). In that case, an oxygen (O) amount may be a little deviated from a stoichiometric composition of the above formula.

In the first aspect, by bringing the dielectric ceramic composition to include the fourth subcomponent and by using a specific method for adding in the production method to be hereinafter described, various characteristics, particularly specific permittivity and IR lifetime, etc., can be satisfactory. Hereinafter, the main component and the fourth subcomponent will be described in detail.

The main component is a compound having a perovskite-type crystal structure specifically expressed by a composition formula of $(Ba_{1-x}Ca_x)(Ti_{1-y}Zr_y)O_3$. Preferably, barium titanate is included in the main component.

In the present embodiment, "x" is $0 \leq x \leq 0.2$, preferably, $0 \leq x \leq 0.15$, and more preferably $0 \leq x \leq 0.10$. The "x" indicates number of Ca atoms. By setting the "x" to be in the above range, the capacity-temperature coefficient and specific permittivity can be controlled accordingly. When the "x" is too large, the specific permittivity tends to be lower. On the other hand, when the "x" is too small, the capacity-temperature characteristic tends to decline. Note that, in the present invention, it is not always necessary to include Ca, and only Ba may be included.

In the present embodiment, "y" is $0 \leq y \leq 0.2$, preferably, $0 \leq y \leq 0.15$, and more preferably $0 \leq y \leq 0.10$. The "y" indicates number of Zr atoms. By substituting $ZrO_2$, which is hard to be reduced comparing with $TiO_2$, the reduction-resistance tends to become furthermore higher. Note that, in the present invention, it is not always necessary to include Zr, and only Ti may be included.

Note that the first main component and the second main component may be different. For example, the first main component may be $BaTiO_3$ and the second main component is $(Ba_{0.9}Ca_{0.1})(Ti_{0.9}Zr_{0.1})O_3$. They may be suitably determined in accordance with desired characteristics.

The fourth subcomponent is a subcomponent comprised of an oxide of R. An R element of an R oxide is at least one kind of elements selected from Y, La, Ce, Pr, Nd, Pm, Sm, Eu, Gd, Tb, Dy, Ho, Er, Tm, Yb and Lu. Among them, Y, Pm, Sm, Eu, Gd, Tb, Dy, Ho, Er, Tm, Yb and Lu are preferable, and Y, Tb and Yb are furthermore preferable.

The fourth subcomponent has an effect of improving the IR accelerated lifetime characteristic. A content of the fourth subcomponent is preferably 0.1 to 10 moles and more preferably 0.2 to 6 moles when calculated in a conversion of R. When the content is too small, the effect of adding the fourth subcomponent cannot be obtained and the capacity-temperature characteristic becomes poor. On the other hand, when the content is too large, the sinterability tends to decline. Note that, as will be explained later on, a step of reacting a part of the fourth subcomponent material in advance with the first main component material is used in the production method of the present embodiment.

The dielectric ceramic composition according to the second aspect includes at least a main component including a compound having a perovskite-type crystal structure expressed by a general formula $ABO_3$ (note that "A" is Ba alone or a composite of Ba and Ca, and "B" is Ti alone or a composite of Ti and Zr), a fourth (a) subcomponent comprised of an oxide of R1 (note that R1 is at least one selected from the first element group composing rare earth elements having a value of effective ionic radius for coordination number 9 of less than 108 pm) included in oxides of R explained above, and a fourth (b) subcomponent comprised of an oxide of R2 included in oxides of R explained above (note that R2 is at least one selected from the second element group composing rare earth elements having a value of effective ionic radius for coordination number 9 of 108 to 113 pm). In that case, an oxygen (O) amount may be slightly deviated from a stoichiometric composition of the above formula.

In the second aspect, as a result that the fourth (a) subcomponent and the fourth (b) subcomponent are included, a later explained predetermined adding method is used and, furthermore, a mole ratio of the R1 (the fourth (a) subcomponent) and the R2 (the fourth (b) subcomponent) is set to be in a specific range, various characteristics, particularly, the specific permittivity and IR lifetime, etc. can become preferable. Details of the main component follow those in the first aspect. Below, the fourth (a) subcomponent and the fourth (b) subcomponent will be explained in detail.

The fourth (a) subcomponent is comprised of the fourth subcomponent and is a subcomponent comprised of an oxide of R1. The R1 is at least one selected from the first element group including Y (107.5 pm), Ho (107.2 pm), Er (106.2 pm), Tm (105.2 pm), Yb (104.2 pm) and Lu (103.2 pm). Among them, Y, Yb and Er are preferable and Y and Yb are more preferable.

The fourth (a) subcomponent has an effect of flattening a temperature characteristic of capacitance. A content of the fourth (a) subcomponent is preferably more than 0 to 10 moles in terms of R1. The lower limit value of the content is preferably 0.1 mole or larger and, more preferably, 0.2 mole or larger in terms of R1. Also, the upper limit value of the content is preferably 6 moles or smaller and, more preferably, 5 mole or smaller in terms of R1. When the content is too small, the effect of adding the fourth subcomponent cannot be obtained and a temperature characteristic of the capacitance declines. While, when the content is too large, the sinterability tends to decline.

The fourth (b) subcomponent is comprised of the fourth subcomponent and is a subcomponent including an oxide of R2. The R2 is at least one selected from the second element group including Dy (108.3 pm), Tb (109.5 pm), Gd (110.7 pm) and Eu (112 pm). Among them, Tb, Gd and Eu are preferable, and Tb and Gd are more preferable.

The fourth (b) subcomponent exhibits an effect of improving IR and an IR accelerated lifetime. A content of the fourth (b) subcomponent is preferably more than 0 to 2 moles, more preferably, more than 0 to 1 mole and, furthermore preferably, more than 0 to 0.5 mole in terms of R2. When the content is too small, the effect of improving the IR and IR accelerated lifetime cannot be obtained, while when too large, a temperature characteristic of the capacitance tends to decline. Note that, as will be explained later on, a production method of the present embodiment has a step for bringing a part of the fourth (a) subcomponent material and/or a part of the fourth (b) subcomponent material to react in advance with a first main component material.

In the second aspect of the present invention, a ratio (M2/M1) of number of moles M2 of R2 of the fourth (b) subcomponent to number of moles M1 of R1 of the fourth (a) subcomponent is $0 \leq M2/M1 \leq 0.25$ and, more preferably, $0 \leq M2/M1 \leq 0.20$ and, furthermore preferably, $0 \leq M2/M1 \leq 0.15$.

In the second aspect, when assuming that a value of an effective ionic radius for coordination number 9 of rare earth elements composing the first element group is r1, and that of the rare earth elements composing the second element group is r2, the first element group and the second element group are preferably composed so that a ratio (r2/r1) of r1 and r2 satisfies a relationship of $1.007 < r2/r1 < 1.06$. For example, a combination of Y (R1) and Gd (R2) may be mentioned as a preferable combination.

Preferably, the dielectric ceramic composition according to the first and second aspects furthermore includes the first to third and fifth subcomponents below.

Namely, it is preferable to furthermore include a first subcomponent comprised of at least one kind selected from MgO, CaO, BaO and SrO, a second subcomponent comprised of $SiO_2$ mainly and comprised of at least one kind selected from MO (note that M is at least one kind selected from Mg, Ca, Ba and Sr), $Li_2O$ and $B_2O_3$, a third subcomponent comprised of at least one kind selected from $V_2O_5$, $MoO_3$ and $WO_3$, and a fifth subcomponent comprised of MnO and/or $Cr_2O_3$.

Ratios of the above respective subcomponents with respect to 100 moles of the main component are, when calculated as a conversion of each oxide, the first subcomponent: 0.1 to 5 moles,
the second subcomponent: 0.1 to 12 moles,
the third subcomponent: more than 0 to 0.3 mole, and
the fifth subcomponent: 0.05 to 1.0 mole; and more preferably,
the first subcomponent: 0.2 to 4 moles,
the second subcomponent: 0.5 to 6 moles,
the third subcomponent: more than 0 to 0.25 mole, and
the fifth subcomponent: 0.05 to 0.4 mole.

As a result that the first to third and fifth subcomponents are furthermore included in the dielectric ceramic composition according to the first aspect and the second aspect of the present invention, a temperature characteristic of the capacitance can be improved and, preferably, the X7R characteristics (−55 to 125° C. and $\Delta C$=within ±15%) of the EIA standard can be satisfied.

Note that, in the present specification, oxides composing the main component and subcomponents are expressed by a stoichiometric composition, but an oxidization state of each of the oxides may be deviated from the stoichiometric composition. Note that the above ratios of the respective subcomponents are obtained by calculating as a conversion of oxides of the stoichiometric composition based on metal amounts included in the oxides composing the respective subcomponents.

The reasons of limiting contents of the respective subcomponents are as below.

When a content of the first subcomponent (MgO, CaO, BaO and SrO) is too small, a temperature change rate of the capacitance becomes large. On the other hand, when the content is too much, it is liable that the sinterability declines and the IR accelerated lifetime deteriorates. Note that component ratios of respective oxides in the first subcomponent may be any.

The second subcomponent includes $SiO_2$ as the main component and at least one selected from MO (note that M is at least one selected from Mg, Ca, Ba and Sr), $Li_2O$ and $B_2O_3$. The second subcomponent mainly acts as a sintering aid. The first subcomponent also includes MO (note that M is at least one selected from Mg, Ca, Ba and Sr), but when MO is made to be a composite oxide with $SiO_2$ and to be a compound expressed by a composition formula $M_xSiO_{2+x}$, the melting point can be lowered. Since the melting point can be lowered, reactivity with the main component can be improved. Note that when using BaO and CaO as the MO, the composite oxide is preferably a compound expressed by a composition formula of $(Ba, Ca)_xSiO_{2+x}$. The "x" in the composition formula of $(Ba, Ca)_xSiO_{2+x}$ is preferably 0.8 to 1.2, and more preferably 0.9 to 1.1. When the "x" is too small, that is, when the content of $SiO_2$ is too much, it reacts with the main component $Ba_mTiO_{2+m}$ to deteriorate the dielectric characteristic. On the other hand, when the "x" is too large, the melting point becomes high to deteriorate the sinterability, which is unfavorable.

The third subcomponent ($V_2O_5$, $MoO_3$ and $WO_3$) exhibits an effect of flattening a temperature characteristic of the capacitance at the Curie's temperature or higher and an effect of improving the IR accelerated lifetime. When a content of the third subcomponent is too small, the effects become insufficient. On the other hand, when the content is too large, the IR declines remarkably. Note that component ratios of respective oxides in the third subcomponent may be any.

The fifth subcomponent (MnO and $Cr_2O_3$) has effects of shifting the Curie's temperature to the high temperature side, flattening a temperature characteristic of the capacitance, improving the insulation resistance (IR), improving the breakdown voltage and lowering the firing temperature, etc.

An average crystal grain diameter of dielectric particles included in the dielectric ceramic composition is not particularly limited, but 0.1 to 0.3 μm is preferable. When the average crystal grain diameter is too small, the specific permittivity tends to become low, while when too large, a change of specific permittivity with time tends to become large. An average crystal grain diameter of the dielectric particles can be measured by the code method for measuring an average particle diameter, for example, from a SEM image of the dielectric particles on an assumption that shapes of the dielectric particles are sphere.

A thickness of the dielectric layers 2 is not particularly limited, but 10 μm or thinner per one layer is preferable, 6 μm or thinner is more preferable, and 4.5 μm or thinner is furthermore preferable. A lower limit of the thickness is not particularly limited and is, for example, 0.5 μm or so.

The number of stacked layers of the dielectric layers 2 is not particularly limited, but 20 or larger is preferable, 50 or larger is more preferable, and 100 or larger is particularly preferable. An upper limit of the number of stacked layers is not particularly limited and is, for example, 2000 or so.

Internal Electrode Layer 3

A conductive material included in the internal electrode layers 3 is not particularly limited, but since components of the dielectric layers 2 have reduction-resistance, so that relatively inexpensive base metals may be used. As base metals to be used as the conductive material, Ni or a Ni alloy is preferable. As a Ni alloy, alloys of one or more elements selected from Mn, Cr, Co and Al with Ni are preferable, and a Ni content in the alloy is preferably 95 wt % or larger. Note that Ni or a Ni alloy may include a variety of trace components, such as P, in an amount of not larger than 0.1 wt % or so. A thickness of the internal electrode layers 3 may be suitably determined in accordance with the use object, etc., but normally it is 0.1 to 3 μm, and particularly 0.2 to 2.0 μm or so is preferable.

External Electrode 4

A conductive material included in the external electrodes 4 is not particularly limited and inexpensive Ni, Cu and alloys of these may be used in the present invention. A thickness of the external electrodes 4 may be suitably determined in accordance with the use object, etc. but normally 10 to 50 μm or so is preferable.

Production Method of Multilayer Ceramic Capacitor

A multilayer ceramic capacitor of the present embodiment is produced by producing a green chip by a normal printing method or a sheet method using paste, firing the result, printing or transferring external electrodes and firing in the same way as in the multilayer ceramic capacitor in the related arts. Below, the production method of the dielectric ceramic composition according to the first aspect will be explained specifically.

First, a dielectric ceramic composition powder included in the dielectric layer paste is fabricated.

In the first aspect, the dielectric ceramic composition powder is fabricated as below. First, a material of the main component is divided to a material of a first main component and a material of a second main component.

Here, when assuming that number of moles of the first main component is n1 mole and number of moles of the second main component is n2 mole, a ratio of the first main component to total number of moles of the first main component and second main component is $0.5 \leq n1/(n1+n2) \leq 1$, preferably $0.5 < n1/(n1+n2) < 1.0$, more preferably $0.75 \leq n1/(n1+n2) \leq 0.90$, and furthermore preferably $0.80 \leq n1/(n1+n2) \leq 0.90$. When "n1/(n1+n2)" is too small, the specific permittivity and the IR lifetime tend to decline. By setting the "n1/(n1+n2)" to be in a preferable range, the CR product can become preferable.

Then, only the first main component material and a part of the fourth subcomponent material (a material corresponding to a part of the fourth subcomponent to be included in the dielectric ceramic composition) are reacted in advance, preferably, dispersed as solid solution to obtain a post-reaction material in advance. Next, the post-reaction material is added with the second main component material, rest of fourth subcomponent material (remaining material of the fourth subcomponent to compose the dielectric ceramic composition) and the first to third and fifth subcomponents, and calcining if necessary, so that a dielectric ceramic composition powder is fabricated.

As a material of the main component, powders of $BaTiO_3$, $CaTiO_3$, $BaZrO_3$ and $CaZrO_3$ or powders of compounds to be the above oxides when fired may be used. Preferably, a powder of $BaTiO_3$ or powders of compounds to be the above oxides when fired are used. An average particle diameter of the main component material is preferably 0.05 to 0.5 μm and, more preferably, 0.1 to 0.4 μm. When the average particle diameter of the main component material is too large, an average crystal grain diameter of dielectric particles after sintering becomes too large and it is liable that the temperature characteristic declines and the insulation resistance (IR) declines. On the other hand, when the average particle diameter is too small, dispersion of an oxide of R as a solid solution in the main component material tends to be uneven. Note that, in the present embodiment, an average particle diameter means a volume-reduced cumulative 50% diameter (D50 diameter), which can be measured by a laser diffraction method, etc. using light scattering.

As the fourth subcomponent material to be reacted in advance with the first main component material, the oxides of R as above and a variety of compounds which become the oxides of R when fired may be used. As the oxides of R and compounds which become the oxides of R when fired, powder materials having an average particle diameter of 0.01 to 0.1 μm or sol materials mentioned below, etc. may be used.

The sol materials are not particularly limited and, for example, hydroxide sol and oxide sol, etc. may be mentioned. Also, a sol particle diameter of the sol materials is normally 1 to 100 nm or so, and as the solvent, water; methanol, ethanol and other alcohols; xylene, toluene and other aromatic solvents; methylethylketone and other ketones; and other organic based solvents may be mentioned.

The compounds which becomes oxides of R when fired are not particularly limited and alkoxide of R and inorganic acid salts of R, etc. may be mentioned. The alkoxide of R is compounds of alcohol and R element and specifically indicates compounds wherein hydrogen of a hydroxyl group of alcohols is substituted by an R element. The alkoxides of R are not particularly limited and a variety of compounds expressed by a general formula of $C_n H_{2n+1}$ OR (n is an integer from 1 to 9) may be used. For example, $CH_3OR$, $C_2H_5OR$, n-$C_3H_7OR$, i-$C_3H_7OR$, etc. may be mentioned.

The fourth subcomponent material to be reacted with the first main component materials in advance is in an amount of preferably more than 0 to 0.5 mole and more preferably 0.01 to 0.2 mole with respect to 100 moles of the main component in terms of R. Alternatively, a ratio of the fourth subcomponent material to be reacted in advance is preferably more than 0 to 50 mol %, more preferably more than 0 to 25 mol %, and furthermore preferably more than 0 to 15 mol % with respect to 100 mol % as a total amount of the fourth subcomponent to be finally included in the dielectric ceramic composition in terms of R.

When an amount of the fourth subcomponent materials to be reacted with the first main component material in advance is too large, a crystal grain diameter of a finally obtained sintered body becomes too large, consequently, it is liable that the temperature characteristics decline and the insulation resistance (IR) declines.

As a method of obtaining a post-reaction material by reacting the first main component material in advance with a part of the fourth subcomponent material, a method of mixing the first main component material and the fourth subcomponent material by using a solvent, etc., evaporating the solvent and calcining and a method of adding a precipitant, etc. to the mixed solution, depositing the fourth subcomponent on the main component and calcining, etc. may be mentioned. Note that a temperature at calcining is preferably 500 to 700° C. or so.

Next, the obtained post-reaction material is added with the second main component material, rest of the fourth subcomponent material (remaining fourth subcomponent material to compose the dielectric ceramic composition), and the first to third and fifth subcomponent materials and, then, mixed and calcined if necessary, so that a dielectric ceramic composition powder is obtained.

As explained above, by using both of the post-reaction material (the first main component+the fourth subcomponent), wherein various characteristics are improved by being reacted in advance with the fourth subcomponent, and the second main component, wherein characteristics of the main component are highly maintained; it is possible to improve specific characteristics, such as a dielectric loss and a CR product, while maintaining the specific permittivity, IR lifetime and other characteristics preferable. As a result, even when using a variety of compounds having a perovskite-type crystal structure as the main component, preferable characteristics can be maintained.

As the rest of the fourth subcomponent material and first to third and fifth subcomponent materials, the oxides as above, mixtures of them, composite oxides and a variety of compounds to be these oxides and composite oxides when fired may be used.

Next, by using the obtained dielectric ceramic composition powder, dielectric layer paste is produced. The dielectric layer paste may be organic based slurry obtained by kneading the dielectric ceramic composition powder and an organic vehicle or water-based slurry.

An organic vehicle is obtained by dissolving a binder in an organic solvent. The binder to be used for the organic vehicle is not particularly limited and may be suitably selected from a variety of normal binders, such as ethyl cellulose and polyvinyl butyral, etc. Also, the organic solvent to be used is not particularly limited and may be suitably selected from a variety of organic solvents, such as terpineol, butyl carbitol, acetone, and toluene, etc., in accordance with a method to be used, such as the printing method and sheet method.

Also, when using water-based slurry as dielectric layer paste, a water-based vehicle obtained by dissolving a water-soluble binder and dispersant, etc. in water may be kneaded with a dielectric material. The water-soluble binder used for the water based vehicle is not particularly limited and, for example, polyvinyl alcohol, cellulose and water-soluble acrylic resin, etc. may be used.

Internal electrode layer paste is fabricated by kneading a conductive material formed by the above variety of conductive metals and alloys, or a variety of oxides, organic metal compounds, and resinates, etc., which become the above conductive materials after firing, with the above organic vehicle.

The external electrode paste may be fabricated in the same way as the above internal electrode layer paste.

A content of the organic vehicle in the above variety of paste is not particularly limited and may be a normal content, for example, the binder may be 1 to 5 wt % or so and the solvent may be 10 to 50 wt % or so. Also, additives selected from a variety of dispersants, plasticizers, dielectrics and insulators, etc. may be included in each paste if necessary. A total content thereof is preferably 10 wt % or smaller.

When using the printing method, the dielectric layer paste and the internal electrode layer paste are stacked by printing on a substrate, such as PET, cut into a predetermined shape and removed from the substrate to obtain a green chip.

When using the sheet method, the dielectric layer paste is used to form a green sheet, the internal electrode layer paste is printed thereon and, then, the results are stacked to obtain a green multilayer body and cut into a predetermined size so as to obtain a green chip.

Before firing, binder removal processing is performed on the green chip. As binder removal conditions, the temperature rising rate is preferably 5 to 300° C./hour and more preferably 10 to 100° C./hour, the holding temperature is preferably 180 to 400° C. and more preferably 200 to 300° C., and the temperature holding time is preferably 0.5 to 24 hours and more preferably 5 to 20 hours. The atmosphere at binder removal is preferably in the air.

Next, the green chip subjected to the binder removal processing is fired. An atmosphere at firing the green chip may be suitably determined in accordance with a kind of a conductive material in the internal electrode layer paste, but when using a base metal, such as Ni or a Ni alloy, as the conductive material, an oxygen partial pressure in the firing atmosphere is preferably $10^{-14}$ to $10^{-9}$ atm. When the oxygen partial pressure is lower than the above range, the conductive material in the internal electrode layer results in abnormal sintering to be broken in some cases. While, when the oxygen partial pressure exceeds the above range, the internal electrode layer tends to be oxidized.

Also, the holding temperature at firing is preferably 1000 to 1400° C., and more preferably 1100 to 1350° C. When the holding temperature is lower than the above range, densification becomes insufficient, while when exceeding the above range, breakings of electrodes due to abnormal sintering of the internal electrode layer, deterioration of the capacity-temperature characteristic due to dispersion of the internal electrode layer component, and a reduction of the dielectric ceramic composition are easily caused.

As other firing condition, the temperature raising rate is preferably 100 to 900° C./hour and more preferably 200 to 900° C./hour, the temperature holding time is preferably 0.5 to 8 hours and more preferably 1 to 3 hours, and the cooling rate is preferably 50 to 500° C./hour and more preferably 200 to 300° C./hour. The firing atmosphere is preferably a reducing atmosphere and a preferable atmosphere gas is, for example, a wet mixed gas of $N_2$ and $H_2$.

When firing in a reducing atmosphere, it is preferable that annealing is performed on the capacitor element body. Annealing is processing for re-oxidizing the dielectric layer and the IR lifetime is remarkably elongated thereby, so that the reliability is improved.

An oxygen partial pressure in the annealing atmosphere is preferably $10^{-8}$ atm or higher, and particularly preferably $10^{-7}$ to $10^{-4}$ atm. When the oxygen partial pressure is lower than the above range, re-oxidization of the dielectric layer becomes difficult, while when exceeding the above range, the internal electrode layer tends to be oxidized.

The holding temperature at annealing is preferably 1200° C. or lower, and particularly preferably 500 to 1200° C. When the holding temperature is lower than the above range, re-oxidization of the dielectric layer becomes insufficient, so that the IR becomes low and the IR accelerated lifetime becomes short easily. On the other hand, when the holding temperature exceeds the above range, not only the internal electrode layer is oxidized to reduce the capacity, but the internal electrode layer reacts with the dielectric base material, and deterioration of the capacity-temperature characteristic, a decline of the IR and a decline of the IR accelerated lifetime are easily caused.

As other annealing conditions, the temperature raising rate is preferably 100 to 900° C./hour and more preferably 200 to 900° C./hour, the temperature holding time is preferably 0.5 to 12 hours and more preferably 1 to 10 hours, and the cooling rate is preferably 50 to 600° C./hour and more preferably 100 to 300° C./hour. Also, a preferable atmosphere gas at annealing is, for example, a wet $N_2$ gas, etc.

In the above binder removal processing, firing and annealing, for example, a wetter, etc. may be used to wet the $N_2$ gas and mixed gas, etc. In that case, the water temperature is preferably 5 to 75° C. or so. Note that the binder removal processing, firing and annealing may be performed continuously or separately.

End surface polishing, for example, by barrel polishing or sand blast, etc. is performed on the capacitor element body obtained as above, and the external electrode paste is printed or transferred and fired to form external electrodes 4. A firing condition of the external electrode paste is preferably, for example, at 600 to 800° C. in a wet mixed gas of $N_2$ and $H_2$ for 10 minutes to 1 hour or so. A cover layer is formed by plating, etc. on the surface of the external electrodes 4 if necessary.

A specific explanation on a production method of a dielectric ceramic composition according to the second aspect of the present invention follows the explanation on the production method of the dielectric ceramic composition according to the first aspect except for steps explained below.

In the production method of the dielectric ceramic composition according to the second aspect, first, a dielectric ceramic composition powder to be included in the dielectric layer paste is fabricated.

In the second aspect, fabrication of the dielectric ceramic composition powder is performed as below. First, a material of the main component and a part of the fourth (a) subcomponent material and/or a part of the fourth (b) subcomponent material (materials corresponding to a part of the fourth (a) subcomponent and the fourth (b) subcomponent to be included in the dielectric ceramic composition) are reacted in advance, preferably, dispersed as solid solution to obtain a post-reaction material (a pre-adding step of subcomponents). Next, the post-reaction material is added with the rest of the fourth subcomponent (a) material and the fourth (b) subcomponent material (remaining fourth (a) subcomponent and the fourth (b) subcomponent to compose the dielectric ceramic composition) and the first to third and fifth subcomponent materials (a post-adding step of subcomponents). After that, by calcining in accordance with need, a dielectric ceramic composition powder is fabricated.

A material of the main component to be used in the above steps follows that in the first aspect. Also, as a material of the subcomponent to be reacted in advance used in the above steps, oxides of R1 or R2 and a variety of compounds to be the oxides of R1 or R2 when fired may be used. For example, a part of an oxide of R1 alone may be reacted in advance, a part of an oxide of R2 alone may be reacted in advance, or a part of an oxide of R1 and a part of an oxide of R2 may be reacted in advance. As the oxides of R1 or R2 and the compounds to be the oxides of R1 or R2 when fired, powder materials having an average particle diameter of 0.01 to 0.1 µm or so or sol materials mentioned above in the first aspect, etc. may be used.

The fourth subcomponent (a) material and/or the fourth (b) subcomponent material to be reacted with the first main component material in advance are in an amount of preferably more than 0 to 0.5 mole, and more preferably more than 0 to 0.4 mole, and furthermore preferably more than 0 to 0.25 mole when calculated as a conversion of R1 and/or R2 with respect to 100 moles of the main component.

When an amount of the fourth subcomponent (a) material and/or fourth (b) subcomponent material to be reacted in advance with the first main component is too much, a crystal grain diameter of a sintered body to be obtained after firing becomes too large and it is liable that a temperature characteristic of the capacitance declines and the IR declines.

As a method of obtaining the post-reaction material by bringing the first main component material to react in advance with a part of the fourth (a) subcomponent material and/or a part of the fourth (b) subcomponent material, in the same way as those in the first aspect, a method of mixing the first main component material and the subcomponent materials by using a solvent, etc., evaporating the solvent and calcining and a method of adding a precipitant, etc. to the mixed solution, depositing the subcomponents on the main component and calcining, etc. may be mentioned. Note that a temperature at the calcination is preferably 500 to 700° C. or so.

Next, by adding the rest of the fourth subcomponent (a) material and fourth (b) subcomponent material (remaining materials of the fourth (a) subcomponent and fourth (b) subcomponent for composing the dielectric ceramic composition) and the first to third and fifth subcomponent materials to the obtained post-reaction material and, then, mixing and, calcining if necessary, a dielectric ceramic composition powder is obtained. As the rest of the fourth (a) subcomponent material, fourth (b) subcomponent material and the first to third and fifth subcomponent materials, the above oxides, mixtures of them, composite oxides, and a variety of compounds to be the oxides and composite oxides when fired may be used.

Steps after that follow those explained in the production method of the dielectric ceramic composition according to the first aspect.

A multilayer ceramic capacitor of the present invention produced as above is mounted on a print substrate, etc. by soldering, etc. and used for a variety of electronic apparatuses, etc.

Embodiments of the present invention were explained above, but the present invention is not limited to the above embodiments and may be variously modified within the scope of the present invention.

For example, in the above embodiment, a multilayer ceramic capacitor was explained as an example of an electronic device according to the present invention, but an electronic device according to the present invention is not limited to the multilayer ceramic capacitor and may be any as far as it includes a dielectric layer composed of a dielectric ceramic composition having the above composition.

EXAMPLES

Below, the present invention will be explained based on furthermore detailed examples, but the present invention is not limited to the examples.

Example 1

First, as a main component material, a $BaTiO_3$ powder having an average particle diameter of 0.35 µm was prepared and divided to a first main component material and a second main component material, so that "n1/(n1+n2)" as a ratio of the first main component to total number of moles of the first main component and second main component becomes a value shown in Table 1. Next, as a fourth subcomponent material (pre-added material) to be reacted in advance, a $Y_2O_3$ powder was prepared, and an amount of the $Y_2O_3$ powder to be reacted with the first main component was weighed to be an amount shown in Table 1. The first main component material (the $BaTiO_3$ powder) and the $Y_2O_3$ powder were pulverized by wet mixing by a ball mill to form slurry, the slurry was dried, then, calcined and pulverized, so that a post-reaction material was obtained. Note that the calcination condition was a temperature raising rate of 200° C./hour, a holding temperature of 500° C., a temperature holding time of 2 hours and an atmosphere being in the air. Namely, in a sample 1, as the main component material, only the $BaTiO_3$ powder was used and an amount of $Y_2O_3$ to be reacted in advance was 0.05 mole in terms of Y atom (0.025 mole in terms of $Y_2O_3$) with respect to 100 moles of the main component (note that an amount of $Y_2O_3$ will be in terms of Y atom in any samples below in the present specification).

Next, as a fourth subcomponent material (a post-added material) to be added to the obtained post-reaction material, $Y_2O_3$ was used. An adding quantity of $Y_2O_3$ was an amount shown in Table 1 with respect to 100 moles of the main component in terms of Y atom. Namely, in the sample 1, it was 0.35 mole (an adding quantity in terms of $Y_2O_3$ was 0.175 mole) in terms of Y atom. Also, the first to third and fifth subcomponent materials to be added to the obtained post-reaction material and adding quantities of respective subcomponents were as below. Namely, MgO (the first subcomponent) was added in an amount of 1.2 mole, (Ba, Ca)SiO$_3$ (the second subcomponent) 0.75 mole, $V_2O_5$ (the third subcomponent) 0.03 mole and MnO (the fifth subcomponent) 0.1 mole. The post-reaction material added with the second main component material (a BaTiO$_3$ powder) and the above subcomponent materials was wet mixed and pulverized by a ball mill to form slurry, and the slurry was dried, calcined and pulverized, so that a dielectric ceramic composition powder was obtained. Note that adding quantities of the respective subcomponents were quantities calculated as a conversion of respective oxides (note that $Y_2O_3$ was calculated as a conversion of Y atom) with respect to 100 moles of the main component.

Note that, in the example 1, a total of an amount of the (pre-added) $Y_2O_3$ reacted in advance and an amount of the (post-added) $Y_2O_3$ added to the post-reaction material becomes an amount of $Y_2O_3$ to be included in the finally obtained dielectric ceramic composition.

The thus obtained dielectric ceramic composition powder in an amount of 100 parts by weight, an acrylic resin in an amount of 4.8 parts by weight, ethyl acetate in an amount of 100 parts by weight, mineral spirit in an amount of 6 parts by weight and toluene in an amount of 4 parts by weight were mixed by a ball mill to form paste, so that dielectric layer paste was obtained.

Next, Ni particles in an amount of 44.6 parts by weight, terpineol in an amount of 52 parts by weight, ethyl cellulose in an amount of 3 parts by weight, benzotriazole in an amount of 0.4 part by weight were kneaded by a triple-roll to form slurry, so that internal electrode layer paste was obtained.

These pastes were used to produce the multilayer ceramic chip capacitor 1 shown in FIG. 1 as below.

First, the obtained dielectric layer paste was used to form a green sheet on a PET film. After printing the internal electrode paste thereon, the sheet was removed from the PET film. Next, the green sheets and protective green sheets (without the internal electrode layer paste printed thereon) were stacked and bonded by pressure, so that a green multilayer body was obtained. Next, the green multilayer body was cut into a predetermined size to obtain a green chip and subjected to binder removal processing, firing and annealing under the conditions below, so that a multilayer ceramic fired body was obtained.

The binder removal processing condition was a temperature raising rate of 32.5° C./hour, holding temperature of 260° C., temperature holding time of 8 hours and the atmosphere was in the air.

The firing condition was a temperature raising rate of 200° C./hour, holding temperature of 1260 to 1280° C., temperature holding time of 2 hours, cooling rate of 200° C./hour, and the atmosphere was a wet mixed gas of $N_2+H_2$ (oxygen partial pressure was $10^{-12}$ atm).

The annealing condition was a temperature raising rate of 200° C./hour, holding temperature of 1050° C., temperature holding time of 2 hours, cooling rate of 200° C./hour, and the atmosphere was a wet $N_2$ gas (oxygen partial pressure was $10^{-5}$ atm).

Note that a wetter with a water temperature of 20° C. was used to wet the atmosphere gases at firing and annealing.

Next, end surfaces of the obtained multilayer ceramic fired body were polished by sand blast and, then, an In—Ga alloy was applied as external electrodes, so that samples of a multilayer ceramic capacitor as an example 1 shown in FIG. 1 were obtained.

A size of the obtained capacitor samples was 3.2 mm×1.6 mm×0.6 mm, the number of dielectric layers sandwiched by the internal electrode layers was 4, a thickness (interlayer thickness) of one dielectric layer was 3.5 µm, and a thickness of one internal electrode layer was 1.2 µm. Next, on the obtained capacitor samples, an average crystal grain diameter of dielectric particles, specific permittivity $\in$, a dielectric loss tan δ, insulation resistance IR, a CR product, a temperature characteristic of capacitance and an IR accelerated lifetime were evaluated by the methods explained below. Also, from the result of conducting an XPS measurement on the post-reaction material obtained by bringing the first main component (BaTiO$_3$) reacting with $Y_2O_3$, it was confirmed that respective elements of Ba, Ti and Y were uniformly distributed inside particles.

Average Crystal Grain Diameter of Dielectric Particles

A method of measuring an average particle diameter of the dielectric particles was cutting an obtained capacitor sample on a surface perpendicular to internal electrodes first, polishing the cut surface, then, performing chemical etching or thermal etching on the polished surface, observing by a scanning electron microscope (SEM) and calculating by the code method on an assumption that shapes of the dielectric particles are spheres. The results are shown in Table 1.

Specific Permittivity $\in$

On each of the capacitor samples, capacitance C was measured under a condition of a reference temperature of 20° C., using a digital LCR meter (YHP4274 A made by Yokogawa Electric Corporation), a frequency of 120 Hz and an input signal level (measurement voltage) of 0.5 Vrms/µm. Then, specific permittivity (no unit) was calculated from the obtained capacitance, a dielectric thickness and a superimposing area of internal electrodes in the multilayer ceramic capacitor. The higher the specific permittivity is, the more preferable. The results are shown in Table 1.

Dielectric Loss tan δ

On each of the capacitor samples, a dielectric loss tan δ was measured under a condition of a reference temperature of 20° C., using a digital LCR meter (YHP4274A made by Yokogawa Electric Corporation), a frequency of 120 Hz and an input signal level (measurement voltage) of 0.5 Vrms/µm. The smaller the dielectric loss is, the more preferable. The results are shown in Table 1.

Insulation Resistance IR

On each of the capacitor samples, insulation resistance IR was measured by using an insulation resistance tester (R8340 A made by Advantest Corporation) after applying a direct current voltage of 4V/µm for one minute at 20° C. The larger the insulation resistance IR is, the more preferable. The results are shown in Table 1.

CR Product

A CR product was measured by obtaining a product of the capacitance C (unit: µF) and insulation resistance IR (unit: MΩ) measured as explained above. The larger the CR product is, the more preferable. The results are shown in Table 1.

Temperature Characteristic of Capacitance.

On each of the capacitor samples, capacitance at −55 to 125° C. was measured and a change rate ΔC of the capacitance was calculated to evaluate whether the X7R characteristics of the EIA standard are satisfied or not. Namely, evaluation was made on whether the change rate ΔC was within ±15% or not at −55 to 125° C. The results are shown in Table 1. Note that samples satisfied the X7 R characteristics were marked as "good" and those not satisfied were marked as "poor" in Table 1.

IR Accelerated Lifetime

On each of the capacitor samples, an acceleration test was conducted under an electric field of 12V/μm at 180° C., and time (unit: hour) until the insulation resistance IR becomes $10^8 \Omega$ or lower was calculated. The longer the IR accelerated lifetime is, the more preferable. The results are shown in Table 1.

smaller than 0.5, the specific permittivity widely declined, and it was confirmed that the IR lifetime was deteriorated.

It was confirmed from the above results that, by setting a value of "n1/(n1+n2)" to 0.5 or higher and bringing the first main component and a part of the fourth subcomponent ($Y_2O_3$) react in advance, a high specific permittivity and preferable IR lifetime can be realized while maintaining other electric characteristics (a dielectric loss tanδ, insulation resistance IR and CR product).

TABLE 1

| Sample No. | Ratio of First Main Component n1/(n1 + n2) | Amount of Rare-earth Element in First Main Component Fourth Y [mol] | Subcomponent Post-added Fourth Y [mol] | Sintered Body Crystal Grain Diameter [μm] | Specific Permittivity ε | tan δ [%] | IR [Ω · m] | CR Product [μF · MΩ] | X7R Characteristics | IR Lifetime [h] |
|---|---|---|---|---|---|---|---|---|---|---|
| Sample 2 | 0 | — | 0.35 | 0.31 | 3390 | 4.6 | 1.6E+11 | 4800 | good | 3.5 |
| Sample 3 | 0.25 | 0.05 | 0.35 | 0.30 | 3480 | 4.6 | 1.4E+11 | 4310 | good | 3.3 |
| Sample 4 | 0.40 | 0.05 | 0.35 | 0.30 | 3750 | 5.2 | 1.4E+11 | 4650 | good | 3.8 |
| Sample 1 | 0.50 | 0.05 | 0.35 | 0.29 | 4000 | 5.6 | 1.4E+11 | 4960 | good | 5.2 |
| Sample 5 | 0.75 | 0.05 | 0.35 | 0.29 | 4500 | 7.2 | 1.5E+11 | 5980 | good | 6.4 |
| Sample 6 | 0.90 | 0.05 | 0.35 | 0.28 | 4640 | 8.4 | 1.3E+11 | 5340 | good | 6.9 |
| Sample 7 | 1 | 0.05 | 0.35 | 0.28 | 4720 | 8.7 | 1.3E+11 | 5430 | good | 7.5 |

With respect to 100 moles of main component,
first subcomponent: MgO 1.2 mol
second subcomponent: (Ba, Ca)SiO$_3$ 0.75 mol
third subcomponent: V$_2$O$_5$ 0.03 mol
fifth subcomponent: MnO 0.1 mol
Average particle diameter of main component material: 0.35 μm
Thickness of one dielectric layer (interlayer thickness) = 3.5 μm
"aE+b" in Table 1 means "a × $10^{+b}$".

Evaluation 1

From Table 1, the samples 1, 5 to 7, wherein "n1/(n1+n2)" as a ratio of the first main component to total number of moles of the first main component and the second main component was 0.5 or higher, exhibited specific permittivity of 4000 or higher and it was confirmed that the IR lifetime was preferable.

On the other hand, in the sample 2, wherein the first main component and the Y$_2$O$_3$ powder were not reacted in advance, and the samples 3 and 4, wherein a value of "n1/(n1+n2)" was Example 2

Other than changing an amount of Y$_2$O$_3$ (the fourth (a) subcomponent) to be reacted with the first main component and an amount of Y$_2$O$_3$ (fourth (a) subcomponent) to be added to the post-reaction material to values shown in Table 2 in terms of Y atom, capacitor samples were obtained in the same way as in the samples 1. The obtained capacitor samples were evaluated in the same way as in the example 1. The results are shown in Table 2.

TABLE 2

| Sample No. | Ratio of First Main Component n1/(n1 + n2) | Amount of Rare-earth Element in First Main Component Fourth Y [mol] | Subcomponent Post-added Fourth Y [mol] | Sintered Body Crystal Grain Diameter [μm] | Specific Permittivity ε | tan δ [%] | IR [Ω · m] | CR Product [μF · MΩ] | X7R Characteristics | IR Lifetime [h] |
|---|---|---|---|---|---|---|---|---|---|---|
| Sample 11 | 0 | — | 0.3 | 0.32 | 3220 | 4.3 | 1.5E+11 | 4280 | good | 3.5 |
| Sample 12 | 0.25 | 0.1 | 0.3 | 0.32 | 3540 | 4.9 | 1.4E+11 | 4390 | good | 4.1 |
| Sample 13 | 0.40 | 0.1 | 0.3 | 0.31 | 3880 | 5.8 | 1.4E+11 | 4810 | good | 4.6 |
| Sample 14 | 0.50 | 0.1 | 0.3 | 0.30 | 4100 | 6.4 | 1.4E+11 | 5080 | good | 6.4 |
| Sample 15 | 0.75 | 0.1 | 0.3 | 0.31 | 4500 | 8.4 | 1.6E+11 | 6370 | good | 6.7 |

TABLE 2-continued

| Sample No. | Ratio of First Main Component n1/(n1 + n2) | Amount of Rare-earth Element in First Main Component Fourth Y [mol] | Subcomponent Post-added Fourth Y [mol] | Sintered Body Crystal Grain Diameter [μm] | Specific Permittivity ϵ | tan δ [%] | IR [Ω · m] | CR Product [μF · MΩ] | X7R Characteristics | IR Lifetime [h] |
|---|---|---|---|---|---|---|---|---|---|---|
| Sample 16 | 0.90 | 0.1 | 0.3 | 0.31 | 4840 | 9.3 | 1.9E+11 | 8140 | good | 6.9 |
| Sample 17 | 1 | 0.1 | 0.3 | 0.30 | 5070 | 9.6 | 1.0E+11 | 4490 | good | 7.7 |

With respect to 100 moles of main component,
first subcomponent: MgO 1.2 mol
second subcomponent: (Ba, Ca)SiO$_3$ 0.75 mol
third subcomponent: V$_2$O$_5$ 0.03 mol
fifth subcomponent: MnO 0.1 mol
Average particle diameter of main component material: 0.35 μm
Thickness of one dielectric layer (interlayer thickness) = 3.5 μm
"aE+b" in Table 1 means "a × 10$^{+b}$".

Evaluation 2

It is confirmed from Table 2, even in the case where an amount of Y$_2$O$_3$ (the fourth (a) subcomponent) to be reacted in advance with the first main component and an amount of Y$_2$O$_3$ (fourth (a) subcomponent) to be added to the post-reaction material are changed, the same results as those in the example 1.

Example 3

Other than using Tb$_2$O$_3$ (fourth (b) subcomponent) instead of Y$_2$O$_3$ (fourth (a) subcomponent) as a material to be reacted in advance and setting an amount of Tb$_2$O$_3$ (the fourth (b) subcomponent) to be reacted with the first main component and an amount of Y$_2$O$_3$ (fourth (a) subcomponent) to be added to the post-reaction material to be the amounts shown in Table 3 in terms of Y atom and Tb atom, capacitor samples were obtained in the same way as in the example 1. The obtained capacitor samples were evaluated in the same way as in the example 1. The results are shown in Table 3.

Note that, in the example 3, a ratio M2/M1 of number of moles M2 of R2 of the fourth (b) subcomponent to number of moles M1 of R1 of the fourth (a) subcomponent in the finally obtained dielectric ceramic composition is 0.14.

TABLE 3

| Sample No. | Ratio of First Main Component n1/(n1 + n2) | Amount of Rare-earth Element in First Main Component Fourth (b) Tb [mol] | Subcomponent Post-added Fourth (a) (R1) Y [mol] | Subcomponent Post-added Fourth (b) (R2) R2 [mol] | Mole Ratio of R1 and R2 M2/M1 | Sintered Body Crystal Grain Diameter [μm] | Specific Permittivity ϵ | tan δ [%] | IR [Ω · m] | CR Product [μF · MΩ] | X7R Characteristics | IR Lifetime [h] |
|---|---|---|---|---|---|---|---|---|---|---|---|---|
| Sample 21 | 0 | — | 0.35 | 0 | 0 | 0.30 | 3390 | 4.3 | 1.2E+11 | 3600 | good | 2.9 |
| Sample 22 | 0.25 | 0.05 | 0.35 | 0 | 0.14 | 0.29 | 3650 | 4.4 | 1.2E+11 | 3810 | good | 2.5 |
| Sample 23 | 0.40 | 0.05 | 0.35 | 0 | 0.14 | 0.29 | 3810 | 4.9 | 1.3E+11 | 4390 | good | 3.1 |
| Sample 24 | 0.50 | 0.05 | 0.35 | 0 | 0.14 | 0.28 | 3950 | 5.1 | 1.4E+11 | 4900 | good | 4.5 |
| Sample 25 | 0.75 | 0.05 | 0.35 | 0 | 0.14 | 0.29 | 4070 | 6.9 | 1.4E+11 | 5050 | good | 4.6 |
| Sample 26 | 0.90 | 0.05 | 0.35 | 0 | 0.14 | 0.30 | 4230 | 8.5 | 1.3E+11 | 4870 | good | 6.7 |
| Sample 27 | 1 | 0.05 | 0.35 | 0 | 0.14 | 0.31 | 4950 | 8.8 | 1.1E+11 | 4860 | good | 7.9 |

With respect to 100 moles of main component,
first subcomponent: MgO 1.2 mol
second subcomponent: (Ba, Ca)SiO$_3$ 0.75 mol
third subcomponent: V$_2$O$_5$ 0.03 mol
fifth subcomponent: MnO 0.1 mol
Average particle diameter of main component material: 0.35 μm
Thickness of one dielectric layer (interlayer thickness) = 3.5 μm
"aE+b" in Table means "a × 10$^{+b}$".

Evaluation 3

It is confirmed from Table 3 that even when using Tb$_2$O$_3$ (fourth (b) subcomponent) instead of Y$_2$O$_3$ (fourth (a) subcomponent) as a material to be reacted in advance with the first main component material, the same results as those in the example 1 can be obtained.

Example 4

A BaTiO$_3$ powder having an average particle diameter of 0.30 μm was used as the main component material, a value of "n1/(n1+n2)" as a ratio of the first main component to the total number of moles of the first main component and the second main component was set to 1, and $Y_2O_3$ (fourth (a) subcomponent) was used as the material to be reacted in advance. Namely, all of the main component material was reacted with $Y_2O_3$ (the fourth (a) subcomponent). Also, $Y_2O_3$ (fourth (a) subcomponent) and $Gd_2O_3$ (fourth (b) subcomponent) were used as materials to be added to the post-reaction material. An amount of the material to be reacted in advance and an amount of the materials to be added to the post-reaction material were set to be the amounts shown in Table 4 in terms of R1 and R2. Furthermore, materials of the first to third and fifth subcomponent to be added to the obtained post-reaction material and adding quantities thereof were as below. Namely, MgO (the first subcomponent) in an amount of 0.75 mole, (Ba, Ca) $SiO_3$ (the second subcomponent) in an amount of 0.875 mole, $V_2O_5$ (the third subcomponent) in an amount of 0.074 mole and MnO (the fifth subcomponent) in an amount of 0.1 mole were added. Other than the above, capacitor samples were obtained in the same way as in the example 1. The obtained capacitor samples were evaluated in the same way as in the example 1. The results are shown in Table 4.

Note that, in Table 5, a ratio M2/M1 of number of moles M1 of R1 of the fourth (a) subcomponent and number of moles M2 of R2 of the fourth (b) subcomponent in the finally obtained dielectric ceramic composition was in a range of 0.08 to 0.42.

Example 5

As the main component material, a $BaTiO_3$ powder having an average particle diameter of 0.30 μm was used. The "n1/(n1+n2)" as a ratio of the first main component to total number of moles of the first main component and the second main component was set to 0.25 in samples 41 to 46, the "n1/(n1+n2)" was set to 0.75 in samples 47 to 52 and the "n1/(n1+n2)" was set to 1 in samples 53 to 58. Also, as the material to be reacted in advance with the first main component material, $Y_2O_3$ (fourth (a) subcomponent) was used, and $Y_2O_3$ (fourth (a) subcomponent) and $Gd_2O_3$ (fourth (b) subcomponent) were used as materials to be added to the post-reaction material. An amount of $Y_2O_3$ (fourth (a) subcomponent) to be reacted in advance and amounts of $Y_2O_3$ fourth (a) subcomponent) and $Gd_2O_3$ (fourth (b) subcomponent) to be added to the post-reaction material are shown in Table 5 in terms of R1 and R2. Furthermore, materials of the first to third and fifth subcomponents to be added to the post-reaction material and adding quantities thereof were as below. Namely, MgO (the first subcomponent) in an amount of 1.00 mole, (Ba, Ca)$SiO_3$

TABLE 4

| Sample No. | Ratio of First Main Component n1/(n1 + n2) | Amount of Rare-earth Element in First Main Component Fourth (a) Y [mol] | Subcomponent Post-added Fourth (a) (R1) Y [mol] | Subcomponent Post-added Fourth (b) (R2) Gd [mol] | Mole Ratio of R1 and R2 M2/M1 | Sintered Body Crystal Grain Diameter [μm] | Specific Permittivity ε | tan δ [%] | IR [Ω·m] | CR Product [μF·MΩ] | X7R Characteristics | IR Lifetime [h] |
|---|---|---|---|---|---|---|---|---|---|---|---|---|
| Sample 31 | 1 | 0.05 | 0.55 | 0 | 0 | 0.35 | 3350 | 6.5 | 6.2E+10 | 1840 | good | 52 |
| Sample 32 | 1 | 0.05 | 0.55 | 0.035 | 0.06 | 0.34 | 3490 | 6.6 | 6.3E+10 | 1950 | good | 85 |
| Sample 33 | 1 | 0.05 | 0.55 | 0.07 | 0.12 | 0.35 | 3600 | 6.9 | 6.3E+10 | 2000 | good | 110 |
| Sample 34 | 1 | 0.05 | 0.55 | 0.14 | 0.23 | 0.33 | 3560 | 7.0 | 6.4E+10 | 2020 | good | 129 |
| Sample 35 | 1 | 0.05 | 0.55 | 0.21 | 0.35 | 0.32 | 3370 | 6.2 | 6.1E+10 | 1820 | good | 74 |
| Sample 36 | 1 | 0.05 | 0.62 | 0 | 0 | 0.35 | 3200 | 5.5 | 5.2E+10 | 1470 | good | 77 |
| Sample 37 | 1 | 0 | 0.74 | 0 | 0 | 0.37 | 2400 | 3.5 | 5.4E+10 | 1150 | poor | 71 |

With respect to 100 moles of main component,
first subcomponent: MgO 0.75 mol
second subcomponent: (Ba, Ca)$SiO_3$ 0.875 mol
third subcomponent: $V_2O_5$ 0.074 mol
fifth subcomponent: MnO 0.1 mol
Average particle diameter of main component material: 0.30 μm
Thickness of one dielectric layer (interlayer thickness) = 3.5 μm
"aE+b" in Table means "a × $10^{+b}$".

Evaluation 4

From Table 4, in the case of bringing all of the main component material react with the materials to be reacted in advance, it was confirmed that the IR lifetime became preferable by increasing an amount of $Gd_2O_3$ (fourth (b) subcomponent) to be added to the post-reaction material and setting M2/M1 as a ratio of number of moles M1 of R1 and number of moles M2 of R2 to be within the range of the present invention.

(the second subcomponent) in an amount of 0.875 mole, $V_2O_5$ (the third subcomponent) in an amount of 0.044 mole and MnO (the fifth subcomponent) in an amount of 0.1 mole were added. Other than the above, capacitor samples were obtained in the same way as in the example 1. The obtained capacitor samples were evaluated in the same way as in the example 1.

Note that, in the example 5, a ratio M2/M1 of number of moles M1 of R1 of the fourth (a) subcomponent and number of moles M2 of R2 of the fourth (b) subcomponent in the finally obtained dielectric ceramic composition was 0.1. The results are shown in Table 5.

TABLE 5

| Sample No. | Ratio of First Main Component $n1/(n1+n2)$ | Amount of Rare-earth Element in First Main Component Fourth (a) Y [mol] | Subcomponent Post-added Fourth (a) (R1) Y [mol] | Subcomponent Post-added Fourth (b) (R2) Gd [mol] | Mole Ratio of R1 and R2 M2/M1 | Sintered Body Crystal Grain Diameter [μm] | Specific Permittivity $\epsilon$ | tan δ [%] | IR [Ω·m] | CR Product [μF·MΩ] | X7R Characteristics | IR Lifetime [h] |
|---|---|---|---|---|---|---|---|---|---|---|---|---|
| Sample 41 | 0.25 | 0.02 | 0.58 | 0.06 | 0.1 | 0.33 | 2440 | 4.5 | 2.1E+11 | 4540 | poor | 9 |
| Sample 42 | 0.25 | 0.05 | 0.55 | 0.06 | 0.1 | 0.31 | 3020 | 4.9 | 1.9E+11 | 5080 | poor | 14 |
| Sample 43 | 0.25 | 0.10 | 0.50 | 0.06 | 0.1 | 0.32 | 2990 | 4.9 | 1.9E+11 | 5030 | poor | 22 |
| Sample 44 | 0.25 | 0.25 | 0.35 | 0.06 | 0.1 | 0.32 | 3180 | 5.1 | 1.5E+11 | 4220 | poor | 10 |
| Sample 45 | 0.25 | 0.50 | 0.10 | 0.06 | 0.1 | 0.33 | 2540 | 7.2 | 1.4E+11 | 3150 | poor | 6 |
| Sample 46 | 0.25 | 0.60 | 0 | 0.06 | 0.1 | 0.43 | 2650 | 9.5 | 1.5E+10 | 350 | poor | 2 |
| Sample 47 | 0.75 | 0.02 | 0.58 | 0.06 | 0.1 | 0.35 | 3020 | 5.7 | 1.6E+11 | 4280 | good | 11 |
| Sample 48 | 0.75 | 0.05 | 0.55 | 0.06 | 0.1 | 0.34 | 3850 | 7.6 | 1.5E+11 | 5110 | good | 17 |
| Sample 49 | 0.75 | 0.10 | 0.50 | 0.06 | 0.1 | 0.34 | 3820 | 8.5 | 1.5E+11 | 5060 | good | 15 |
| Sample 50 | 0.75 | 0.25 | 0.35 | 0.06 | 0.1 | 0.33 | 3890 | 8.7 | 1.4E+11 | 4820 | good | 25 |
| Sample 51 | 0.75 | 0.50 | 0.10 | 0.06 | 0.1 | 0.35 | 3740 | 9.8 | 1.1E+11 | 3640 | poor | 18 |
| Sample 52 | 0.75 | 0.60 | 0 | 0.06 | 0.1 | 0.46 | 4470 | 13.3 | 1.6E+10 | 633 | poor | 4 |
| Sample 53 | 1 | 0.02 | 0.58 | 0.06 | 0.1 | 0.37 | 3400 | 7.3 | 1.2E+11 | 3610 | good | 12 |
| Sample 54 | 1 | 0.05 | 0.55 | 0.06 | 0.1 | 0.35 | 4100 | 9.6 | 1.3E+11 | 4790 | good | 17 |
| Sample 55 | 1 | 0.10 | 0.50 | 0.06 | 0.1 | 0.35 | 4300 | 9.7 | 1.5E+11 | 5710 | good | 25 |
| Sample 56 | 1 | 0.25 | 0.35 | 0.06 | 0.1 | 0.34 | 4320 | 10.0 | 1.4E+11 | 5350 | good | 20 |
| Sample 57 | 1 | 0.50 | 0.10 | 0.06 | 0.1 | 0.37 | 3630 | 11.5 | 8.5E+10 | 2730 | poor | 16 |
| Sample 58 | 1 | 0.60 | 0 | 0.06 | 0.1 | 0.48 | 5200 | 15.2 | 8.8E+09 | 405 | poor | 6 |

With respect to 100 moles of main component,
first subcomponent: MgO 1.00 mol
second subcomponent: (Ba, Ca)SiO$_3$ 0.875 mol
third subcomponent: V$_2$O$_5$ 0.044 mol
fifth subcomponent: MnO 0.1 mol
Average particle diameter of main component material: 0.30 μm
Thickness of one dielectric layer (interlayer thickness) = 3.5 μm
"aE+b" in Table means "a × 10$^{+b}$".

Evaluation 5

It was confirmed from Table 5 that, when the value of "n1/(n1+n2)" was set to 0.75 and 1, characteristics, such as the specific permittivity, dielectric loss, IR, CR product, temperature characteristic of the capacitance and IR lifetime, were all maintained at high levels. Note that when the amount of the material (Y$_2$O$_3$) to be reacted in advance with the first main component material was out of the preferable range (larger than 0 and smaller than 0.5 mole) of the present invention, while the specific permittivity was relatively high, the dielectric loss, CR product and IR lifetime tended to be deteriorated. Accordingly, it is confirmed that the amount of the material (Y$_2$O$_3$) to be reacted in advance with the first main component material is preferably in the preferable range of the present invention.

On the other hand, when the value of "n1/(n1+n2)" was 0.25, it was confirmed that the specific permittivity, a temperature characteristic of the capacitance and IR lifetime were deteriorated.

It is confirmed from the above results that, when the value of "n1/(n1+n2)" is out of the range of the present invention, preferable characteristics cannot be realized even if the value of M2/M1 as a ratio of number of moles M1 of R1 and number of moles M2 of R2 is in the ranges of the present invention.

Example 6

Other than using Yb$_2$O$_3$ (fourth (a) subcomponent) instead of Y$_2$O$_3$ (fourth (a) subcomponent) as the material to be reacted in advance and setting the adding quantity to the value shown in Table 6 in terms of Yb atom, capacitor samples were obtained in the same way as in the example 5. The obtained capacitor samples were evaluated in the same way as in the example. 1. The results are shown in Table 6.

TABLE 6

| Sample No. | Ratio of First Main Component $n1/(n1+n2)$ | Amount of Rare-earth Element in First Main Component Fourth (a) Yb [mol] | Subcomponent Post-added Fourth (a) (R1) Y [mol] | Subcomponent Post-added Fourth (b) (R2) Gd [mol] | Mole Ratio of R1 and R2 M2/M1 | Sintered Body Crystal Grain Diameter [μm] | Specific Permittivity $\epsilon$ | tan δ [%] | IR [Ω·m] | CR Product [μF·MΩ] | X7R Characteristics | IR Lifetime [h] |
|---|---|---|---|---|---|---|---|---|---|---|---|---|
| Sample 61 | 0.25 | 0.02 | 0.58 | 0.06 | 0.1 | 0.35 | 2670 | 3.9 | 2.0E+11 | 4730 | poor | 4 |
| Sample 62 | 0.25 | 0.05 | 0.55 | 0.06 | 0.1 | 0.32 | 3780 | 5.0 | 2.0E+11 | 6700 | poor | 8 |

TABLE 6-continued

| Sample No. | Ratio of First Main Component n1/(n1 + n2) | Amount of Rare-earth Element in First Main Component Fourth (a) Yb [mol] | Subcomponent Post-added Fourth (a) (R1) Y [mol] | Fourth (b) (R2) Gd [mol] | Mole Ratio of R1 and R2 M2/M1 | Sintered Body Crystal Grain Diameter [μm] | Specific Permittivity ε | tan δ [%] | IR [Ω·m] | CR Product [μF·MΩ] | X7R Characteristics | IR Lifetime [h] |
|---|---|---|---|---|---|---|---|---|---|---|---|---|
| Sample 63 | 0.25 | 0.10 | 0.50 | 0.06 | 0.1 | 0.31 | 3590 | 6.1 | 1.8E+11 | 5720 | poor | 6 |
| Sample 64 | 0.25 | 0.25 | 0.35 | 0.06 | 0.1 | 0.33 | 2900 | 6.3 | 1.5E+11 | 3850 | poor | 13 |
| Sample 65 | 0.25 | 0.50 | 0.10 | 0.06 | 0.1 | 0.36 | 3310 | 10.1 | 1.1E+11 | 3220 | poor | 5 |
| Sample 66 | 0.25 | 0.60 | 0 | 0.06 | 0.1 | 0.42 | 4350 | 10.9 | 1.0E+10 | 3850 | poor | 4 |
| Sample 67 | 0.75 | 0.02 | 0.58 | 0.06 | 0.1 | 0.37 | 3360 | 5.8 | 1.4E+11 | 4160 | good | 5 |
| Sample 68 | 0.75 | 0.05 | 0.55 | 0.06 | 0.1 | 0.35 | 4060 | 7.9 | 1.3E+11 | 4670 | good | 12 |
| Sample 69 | 0.75 | 0.10 | 0.50 | 0.06 | 0.1 | 0.34 | 4160 | 8.8 | 1.2E+11 | 4420 | good | 15 |
| Sample 70 | 0.75 | 0.25 | 0.35 | 0.06 | 0.1 | 0.34 | 3670 | 9.5 | 1.2E+11 | 3900 | good | 18 |
| Sample 71 | 0.75 | 0.50 | 0.10 | 0.06 | 0.1 | 0.35 | 3730 | 10.0 | 9.0E+10 | 2970 | good | 12 |
| Sample 72 | 0.75 | 0.60 | 0 | 0.06 | 0.1 | 0.46 | 4720 | 14.1 | 1.1E+10 | 4600 | good | 4 |
| Sample 73 | 1 | 0.02 | 0.58 | 0.06 | 0.1 | 0.38 | 3620 | 7.3 | 1.2E+11 | 3850 | good | 7 |
| Sample 74 | 1 | 0.05 | 0.55 | 0.06 | 0.1 | 0.36 | 4350 | 9.6 | 1.3E+11 | 5000 | good | 14 |
| Sample 75 | 1 | 0.10 | 0.50 | 0.06 | 0.1 | 0.35 | 4210 | 9.7 | 1.5E+11 | 5590 | good | 14 |
| Sample 76 | 1 | 0.25 | 0.35 | 0.06 | 0.1 | 0.35 | 4070 | 10.0 | 1.4E+11 | 5050 | good | 21 |
| Sample 77 | 1 | 0.50 | 0.10 | 0.06 | 0.1 | 0.35 | 3760 | 11.5 | 8.5E+10 | 2830 | poor | 10 |
| Sample 78 | 1 | 0.60 | 0 | 0.06 | 0.1 | 0.52 | 4820 | 16.2 | 7.9E+09 | 340 | poor | 3 |

With respect to 100 moles of main component,
first subcomponent: MgO 1.00 mol
second subcomponent: (Ba, Ca)SiO$_3$ 0.875 mol
third subcomponent: V$_2$O$_5$ 0.044 mol
fifth subcomponent: MnO 0.1 mol
Average particle diameter of main component material: 0.30 μm
Thickness of one dielectric layer (interlayer thickness) = 3.5 μm
"aE+b" in Table means "a × 10$^{+b}$".

Evaluation 6

It is confirmed from Table 6 that, even when using Yb$_2$O$_3$ as the material to be reacted in advance, the same results as those in the example 5 can be obtained.

What is claimed is:

1. A production method of a dielectric ceramic composition comprising
   a main component including a compound having a perovskite-type crystal structure expressed by a general formula ABO$_3$, wherein "A" is Ba alone or a composite of Ba and Ca, and "B" is Ti alone or a composite of Ti and Zr, and
   a fourth subcomponent including an oxide of R, wherein R is at least one selected from Y, La, Ce, Pr, Nd, Pm, Sm, Eu, Gd, Tb, Dy, Ho, Er, Tm, Yb and Lu;
   comprising steps of:
   dividing a material of said main component to two as a material of a first main component and a material of a second main component,
   obtaining a post-reaction material by bringing the material of said first main component to react with a part of a material of said fourth subcomponent to be included in said dielectric ceramic composition in advance of a step of firing,
   obtaining a material of said dielectric ceramic composition by adding the material of said second main component and rest of the material of said fourth subcomponent to be included in said dielectric ceramic composition into said post-reaction material, and
   firing said material of said dielectric ceramic composition, wherein, when number of moles of said first main component is n1 mole and number of moles of said second main component is n2, a ratio of said first main component to total number of moles of said first main component and said second main component is $0.75 \leq n1/(n1+n2) \leq 0.90$.

2. The production method of a dielectric ceramic composition as set forth in claim 1, wherein said post-reaction material is obtained by solid state reaction between the material of said first main component and the part of the material of said fourth subcomponent.

3. The production method of a dielectric ceramic composition as set forth in claim 1, wherein a content of said fourth subcomponent in said dielectric ceramic composition to be obtained finally is 0.1 to 10 moles in terms of R with respect to 100 moles of said main component.

4. The production method of a dielectric ceramic composition as set forth in claim 1, wherein a content of said fourth subcomponent to be brought to react with the material of said first main component is larger than 0 mole and smaller than 0.5 mole in terms of R with respect to 100 moles of said main component in advance of the step of firing.

5. The production method of a dielectric ceramic composition as set forth in claim 1, wherein a ratio of said fourth subcomponent to be brought to react with the material of said first main component is larger than 0 mol % and smaller than 50 mol % in terms of R with respect to 100 mol % as a total amount of said fourth subcomponent to be finally included in said dielectric ceramic composition in advance of the step of firing.

6. A production method of a dielectric ceramic composition comprising
   a main component including a compound having a perovskite-type crystal structure expressed by a general formula $ABO_3$, wherein "A" is Ba alone or a composite of Ba and Ca, and "B" is Ti alone or a composite of Ti and Zr,
a fourth (a) subcomponent including an oxide of R1, wherein R1 is at least one selected from rare-earth elements having an effective ionic radius for coordination number 9 of less than 108 pm, and
a fourth (b) subcomponent including an oxide of R2, wherein R2 is at least one selected from rare-earth elements having an effective ionic radius for coordination number 9 of 108 pm to 113 pm;
comprising steps of:
dividing a material of said main component to two as a material of a first main component and a material of a second main component,
obtaining a post-reaction material by bringing the material of said first main component to react with a part of a material of said fourth (a) subcomponent and/or a part of a material of said fourth (b) subcomponent to be included in said dielectric ceramic composition in advance of a step of firing;
obtaining a material of said dielectric ceramic composition by adding the material of said second main component and rest of materials of said fourth (a) subcomponent and said fourth (b) subcomponent to be included in said dielectric ceramic composition into said post-reaction material; and
firing said material of said dielectric ceramic composition;
wherein a ratio (M2/M1) of number of moles M2 of R2 of said fourth (b) subcomponent to number of moles M1 of R1 of said fourth (a) subcomponent in said dielectric ceramic composition to be obtained finally satisfies $0 \leq M2/M1 \leq 25$, and
when number of moles of said first main component is n1 mole and number of moles of said second main component is n2, a ratio of said first main component to total number of moles of said first main component and said second main component is $0.75 \leq n1/(n1+n2) \leq 0.90$.

7. The production method of a dielectric ceramic composition as set forth in claim 6, wherein said post-reaction material is obtained by solid state reaction between the material of said first main component and the part of the material of said fourth (a) subcomponent and/or the part of the material of said fourth (b) subcomponent to be included in said dielectric ceramic composition.

8. The production method of a dielectric ceramic composition as set forth in claim 6, wherein
a content of said fourth (a) subcomponent in said dielectric ceramic composition to be obtained finally is more than 0 to 10 moles in terms of R1 with respect to 100 moles of said main component, and
a content of said fourth (b) subcomponent in said dielectric ceramic composition to be obtained finally is more than 0 to 2 moles in terms of R2 with respect to 100 moles of said main component.

9. The production method of a dielectric ceramic composition as set forth in claim 6, wherein said fourth (a) subcomponent and/or said fourth (b) subcomponent to be brought to react with the material of said first main component is larger than 0 and smaller than 0.5 mole in terms of R1 and/or R2 with respect to 100 moles of said main component in advance of the step of firing.

10. The production method of a dielectric ceramic composition as set forth in claim 6, wherein, when an effective ionic radius for coordination number 9 of rare earth elements composing said R1 is r1 and an effective ionic radius for coordination number 9 of rare earth elements composing said R2 is r2, said R1 and said R2 are selected so that a ratio (r2/r1) of r1 and r2 satisfies a relationship of $1.007 < r2/r1 < 1.06$.

11. The production method of a dielectric ceramic composition as set forth in claim 6, wherein said R1 is at least one selected from Y, Ho, Er, Tm, Yb and Lu.

12. The production method of a dielectric ceramic composition as set forth in claim 6, wherein said R2 is at least one selected from Dy, Tb, Gd and Eu.

13. The production method of a dielectric ceramic composition as set forth in claim 1, wherein
said dielectric ceramic composition furthermore comprises
a first subcomponent including at least one selected from MgO, GaO, BaO and SrO,
a second subcomponent including mainly $SiO_2$ and at least one selected from MO, $Li_2O$ and $B_2O_3$, wherein M is at least one selected from Mg, Ca, Ba and Sr and
a third subcomponent including at least one selected from $V_2O_5$, $MoO_3$ and $WO_3$; and
ratios of the respective subcomponents with respect to 100 moles of said main component are
the first subcomponent: 0.1 to 5 moles,
the second subcomponent: 0.1 to 12 moles, and
the third subcomponent: more than 0 to 0.3 mole.

14. The production method of a dielectric ceramic composition as set forth in claim 6, wherein
said dielectric ceramic composition furthermore comprises
a first subcomponent including at least one selected from MgO, CaO, BaG and SrO,
a second subcomponent including mainly $SiO_2$ and at least one selected from MO, $Li_2O$ and $B_2O_3$, wherein M is at least one selected from Mg, Ca, Ba and Sr and
a third subcomponent including at least one selected from $V_2O_5$, $MoO_3$ and $WO_3$; and
ratios of the respective subcomponents with respect to 100 moles of said main component are
the first subcomponent: 0.1 to 5 moles,
the second subcomponent: 0.1 to 12 moles, and
the third subcomponent: more than 0 to 0.3 mole.

15. The production method of a dielectric ceramic composition as set forth in claim 13, wherein
said dielectric ceramic composition furthermore comprises a fifth subcomponent including MnO and/or $Cr_2O_3$, and
a ratio of the fifth subcomponent with respect to 100 moles of said main component is 0.05 to 1.0 mole.

16. The production method of a dielectric ceramic composition as set forth in claim 14, wherein
said dielectric ceramic composition furthermore comprises a fifth subcomponent including MnO and/or $Cr_2O_3$, and
a ratio of the fifth subcomponent with respect to 100 moles of said main component is 0.05 to 1.0 mole.

* * * * *